(No Model.)
G. COOK.
SWITCH STAND.
No. 485,908. Patented Nov. 8, 1892.
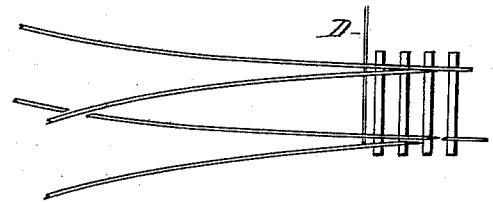
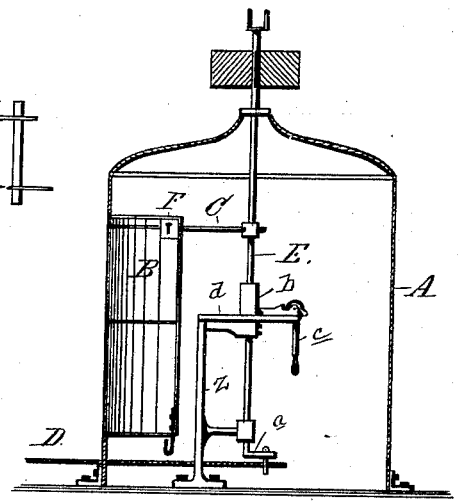
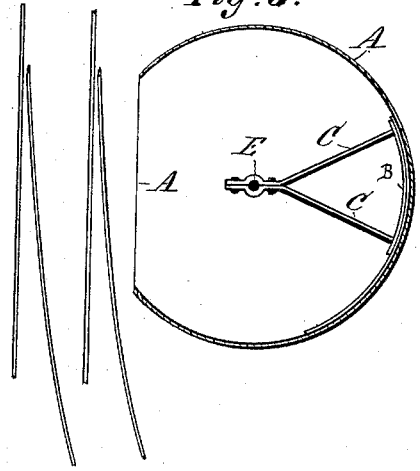
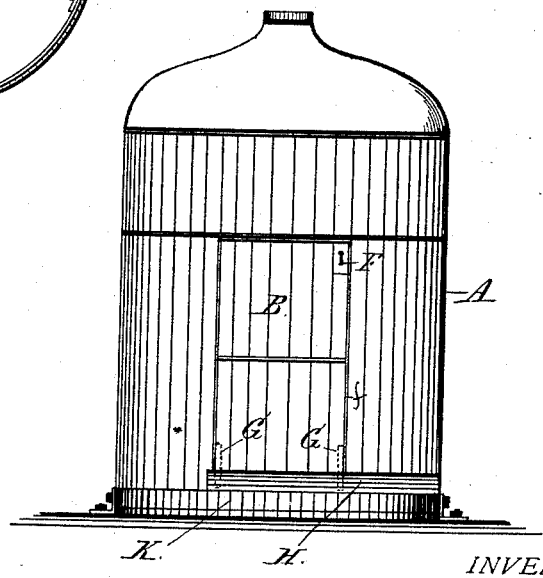
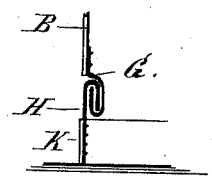
WITNESSES:
Helmuth Holtz
Perry D. Parks
INVENTOR
Gustave Cook
by W. S. Stringfellow
ATTORNEY

UNITED STATES PATENT OFFICE.

GUSTAVE COOK, OF NEW ORLEANS, LOUISIANA, ASSIGNOR OF ONE-HALF TO WILLIAM H. BOFINGER, OF SAME PLACE.

SWITCH-STAND.

SPECIFICATION forming part of Letters Patent No. 485,908, dated November 8, 1892.

Application filed October 22, 1891. Serial No. 409,566. (No model.)

*To all whom it may concern:*

Be it known that I, GUSTAVE COOK, a citizen of the United States, residing at New Orleans, in the parish of Orleans and State of Louisiana, have invented certain new and useful Improvements in Switch-Stands; and I do declare the following to be a full, clear, and exact description of the invention, such as will enable others skilled in the art to which it appertains to make and use the same.

My invention relates to that class of devices in which the switch-stand and operating-lever is arranged within a house, cage, or inclosure, so as to prevent the unauthorized moving or shifting of the switch.

The invention will be fully understood from the following description and claim, when taken in connection with the annexed drawings, in which—

Figure 1 is a vertical sectional view of the cage or inclosure, showing the door, target-rod, switch-stand, and operating devices in elevation. Fig. 2 is a plan view of a section of railway and switch, with the switch-rod partly broken away. Fig. 3 is a horizontal sectional view of the cage or inclosure, with its door and target rod or staff, showing a section of the railway in plan. Fig. 4 is a face view of the inclosure or cage with the door closed; and Fig. 5 is a vertical detail sectional view of the inclosure and door, taken through the guides for said door.

Referring by letter to said drawings, A indicates a cage or inclosure. This cage may be formed from any suitable material, and preferably sheet-iron or cast-iron of an approximately horseshoe shape in cross-section. This cage or inclosure is arranged at one side of the roadway and at a sufficient distance from the switch.

Z indicates the switch-stand, which may be of any suitable construction and provided with suitable guideways to receive the vertical target-rods E, which is provided at its lower end with an angular branch $a$, which is connected by means of a bolt or the like with one end of the switch-rod D, so that by turning the target-rod, as will be presently described, the switch-rod will be reciprocated and the switch shifted in the desired direction.

$b$ indicates an arm which is designed to be secured to the target-rod, and pivotally connected to the horizontal branch of this arm, as better seen in Fig. 1 of the drawings, is a handle $c$, whereby said arm $b$ may be moved and with it the target-rod and consequently the switch-rod, and in practice this handle is designed to enter a notch in a horizontal plate $d$ of the switch-stand D. The cage or inclosure $a$ being of approximately-horseshoe shape in cross-section or having a flat side $e$, will permit of it being brought nearer the rails, and said cage or inclosure is provided with an opening or doorway $f$.

H indicates a guard for snow or the like, which is preferably composed of a strip of sheet metal, although it may be made from other suitable material. This guard is of an inverted-U shape in cross-section and is secured to the sill or base K of the cage or inclosure, as better shown in Fig. 5 of the drawings, and this guard, which extends across the doorway, also extends a sufficient distance around the inner side of the base or sill of said cage to serve as a guide in connection with hooks carried by the door, as will be presently explained.

B indicates the door, which is designed to slide within the cage so as to close and open the doorway. This door has fixed to it on its inner side and preferably at its upper end an arm or arms C, there being two shown in the present illustration. These arms, which are fixed at their outer ends to the door, are designed to be secured to the target-rod E at their inner ends by means of bolts or other suitable clamping devices, so that when the target-rod has been moved the door must also move, and vice versa.

G indicates hooks carried by the door. These hooks, which are secured to each lower corner of the door, are of a form in cross-section approximately the same as the guard H and are designed to take into the same, but not touch so as to bind, which might result from contraction and expansion in atmospheric changes.

It should be understood that the connection of the switch-rod to the target-rod and the connection of the door to said target-rod are such that when the switch has been set to the siding by the manipulation of the handle $c$ the door of the cage or inclosure will simultaneously close and as the attendant sets the switch to the main line the door of the inclosure will open, so that the switch cannot be set to the siding while the door is closed and to set the switch for the siding the switch necessarily closes the door, so that an attendant who might be careless cannot leave the inclosure while the switch is so set.

The door may be provided with a lock F, so that a person who is unauthorized cannot open the door.

Having described my invention, what I claim is—

The inclosure having the doorway, in combination with the guard H, arranged on the inner side at the base of the cage, the slidable door having the hooks G on its inner side and at its base and taking into the guard H, the switch-stand within the cage, the target-rod arranged in the stand, the switch-rod connected with the lower end of the target-rod, as described, and the arms securing the door to the target-rod in such a manner that the turning of said rod to set the switch to the siding will close the door of the cage and the turning of the rod to reset the switch will open the door, substantially as specified.

In testimony whereof I affix my signature in presence of two witnesses.

GUSTAVE COOK.

Witnesses:
W. H. BOFINGER,
PERCY D. PARKS.